United States Patent
Trappe et al.

(10) Patent No.: US 6,651,006 B1
(45) Date of Patent: Nov. 18, 2003

(54) METHOD FOR PROCESSING SEISMIC DATA

(75) Inventors: Henning Trappe, Isernhagen (DE); Carsten Hellmich, Hannover (DE); Marc Föll, Hannover (DE)

(73) Assignee: Henning Trappe, Isernhagen (DE)

( * ) Notice: Subject to any disclaimer, the term of this patent is extended or adjusted under 35 U.S.C. 154(b) by 0 days.

(21) Appl. No.: 09/890,658

(22) PCT Filed: Jan. 12, 2000

(86) PCT No.: PCT/DE00/00139
§ 371 (c)(1),
(2), (4) Date: Aug. 2, 2001

(87) PCT Pub. No.: WO00/46615
PCT Pub. Date: Aug. 10, 2000

(30) Foreign Application Priority Data

Feb. 3, 1999 (DE) ........................................ 199 04 347

(51) Int. Cl.$^7$ .................................................. G01V 1/28
(52) U.S. Cl. .......................................... 702/14; 702/17
(58) Field of Search .............................. 702/14, 16, 17, 702/18; 367/38, 47, 73

(56) References Cited

U.S. PATENT DOCUMENTS

| | | |
|---|---|---|
| 5,153,858 A | 10/1992 | Hildebrand |
| 5,157,638 A | 10/1992 | Loumos et al. |
| 5,432,751 A | 7/1995 | Hildebrand |
| 5,586,082 A | 12/1996 | Anderson et al. |
| 6,101,446 A * | 8/2000 | des Vallieres et al. ........ 702/11 |

FOREIGN PATENT DOCUMENTS

| | | | |
|---|---|---|---|
| EP | 0796442 | 4/1997 | |
| EP | 0832442 | 10/1997 | |
| GB | 1 531 548 | 11/1978 | |
| WO | WO 96/18915 | 6/1996 | |
| WO | WO97/41455 | * 11/1997 | ............ G01V/1/30 |

* cited by examiner

Primary Examiner—Marc S. Hoff
Assistant Examiner—Anthony Gutierrez
(74) Attorney, Agent, or Firm—Collard & Roe, P.C.

(57) ABSTRACT

The invention relates to a method for processing a seismic 2-D or 3-D measurement data set comprised of a multitude of seismic traces each comprising a series of data points provided with amplitude values. The inventive method is characterized by the following steps: Converting the measurement data set into a binary data set in which either the number "0" is assigned to each data point when an amplitude value is less than a predetermined threshold value, or else the number "1" is assigned to each data point; including a vicinity which is located around each binarized data point and which is defined by a predetermined cell size in a similarity analysis, hereby a value is assigned to each data point. The value reflects the degree of similarity of the binary data values in the respective allocated cell and, alternatively corresponds to the larger number of data points having the same binary value of the cell, to the sum of the respective larger number of data points having the same binary value in the horizontal planes containing the many data points, or corresponds to the sum of the respective larger number of data points having the same binary value in each trace of the cell.

12 Claims, 4 Drawing Sheets

METHOD FOR PROCESSING SEISMIC DATA

CROSS REFERENCE TO RELATED APPLICATIONS

Applicants claim priority under 35 U.S.C. §119 of GERMAN Application No. 199 04 347.7, filed: Feb. 3, 1999. Applicants also claim priority under 35 U.S.C. §120 of PCT/DE00/00139, filed: Jan. 12, 2000. The international application under PCT article 21(2) was not published in English.

BACKGROUND OF THE INVENTION

The invention relates to a method for processing a seismic 2-D or 3-D measurement data set comprising a great number of seismic traces each comprising a series of data points occupied by amplitude values.

Methods for exploring seismic data are employed worldwide for the purpose of obtaining additional knowledge about the spread of subterranean geological structures in addition to information gathered from sunk drilling holes. Owing to the information obtained from seismic data it is often possible to dispense with further cost-intensive exploration drilling operations, or to restrict their number to a minimum.

Sensors (geophones/hydrophones) are employed in the seismic exploration of subterranean structures that are lined up one after the other (2-D-seismology), or which are receiving sound waves. Such waves are excited by a seismic source, for example by an explosive charge, vibratory excitement or air guns, and are partly reflected back to the surface by the beds of the earth. The waves are registered by the sensors on the surface and recorded in the form of time series. Such a time series represents the seismic energy received in the form of amplitude variations. It is digitally stored and consists of uniformly arranged data points (samples), which are characterized by the time and the associated amplitude values. Such a time series is referred to also as a seismic trace. The measurement series migrates over the area to be explored, so that a seismic 2-D profile is recorded with such an arrangement.

The goal of the subsequent processing operation is to suppress the noise, for example by batch processing, or with the help of filters employed in a targeted manner. The results so obtained are vertical profiles in which amplitudes and propagation times as well as attributes derived from amplitudes are represented that serve as the basis for further geological evaluation. The geological strata can be observed on a profile by lining up the amplitudes laterally.

If the data are recorded not only along a line but in a flat matrix, a three-dimensional data volume is obtained. In the case of the 3-D volume, an amplitude value is assigned to any desired point in the underground structure that is described, for example by Cartesian coordinates. The vertical direction is measured in time (sound propagation time).

Large amounts of data (several gigabytes) are collected in such a process, which are stored and subjected to processing before the actual interpretation is possible with respect to, for example further exploration of the subterranean structures. Such processes require comprehensive computer resources and software for processing and correcting the received signals. The result is a seismic volume in the form of a 3-D data set that represents physical properties of the explored subterranean structure in a seismic reproduction.

Any desired sections such as, for example vertical profiles and horizontal slices relating to different depths of exploratory drilling can be extracted from said data set, which are then interpreted by geophysicists and geologists in the further course of the exploration operation. As such interpretation of the seismic reproductions so obtained substantially comprises an optical correlation, attempts have been made to automate such reproductions through subjective interpretation depending on one or a number of interpreters.

A method for seismic data processing is known from WO 96/18915, by which a seismic 3-D volume is divided in a great number of horizontal slices that are vertically standing one on top of the other and spaced from each other, whereby at least one slice is divided in a multitude of cells. In this process, each cell has at least 3 trace sections, whereby the first and the second trace sections are arranged in a vertical plane in the direction of the profile (inline), and the third trace section with the first trace section is arranged in a vertical plane substantially perpendicular to the direction of the profile (crossline). A cross correlation is subsequently carried out between each two trace sections in the two vertical planes, which results in inline- and crossline-values that are dependent upon the inclination of the beds of the earth. Combining such values in one cell results in a coherence value for the cell that is assigned to a data point of the cell. The end result in turn is a 3-D data volume from which any desired sections can be extracted and represented.

A method and a device for seismic data processing by means of coherency characteristics is known from EP 0 832 442 A1. In said process, a seismic volume is divided in horizontal slices in a manner similar to the method employed in the aforementioned published document, and said slices are in turn divided in cells. Said cells have the shape of cubes in the simplest case. Based on the at least two trace sections present in a cell, a correlation matrix is formed representing in each case the sum of the differences between the inner and the outer products of the set of values based on the trace sections. The quotient based on the highest inherent value of the matrix and the sum of all inherent values is then computed as the measure for the coherence. A 3-D volume consisting of coherence values is subsequently obtained in turn as the result.

Furthermore, EP 0 796 442 A1 relates to a method and a device for seismic data processing, by which a coherence method is carried out that is based on a semblance analysis. In a manner that is similar to the one employed in conjunction with the two aforementioned methods, a seismic data volume is divided in at least one horizontal time slice and the latter is then divided in a great number of three-dimensional analysis cells, whereby each cell comprises two predetermined lateral directions that are perpendicular in relation to one another, and at least five seismic trace sections that are arranged therein next to each other. A semblance value of the trace sections present in the cell is assigned to the corresponding data point in the respective cell. In said conjunction, the semblance is a known measure for the correspondence among seismic trace sections. By searching various earth bed inclinations and directions, the incidence and the direction of incidence of the analyzed reflector are then determined based on the best coherence. The computed inclination data are subsequently displayed for each cell in addition to the semblance value as well.

The three evaluation methods specified above do in fact permit supporting the data interpretation in an automated manner; however, the higher objectivity in the interpretation achieved in that way is traded for substantial expenditure required for computing the seismic data.

An image processing method is known from the presentation of the DGMK Deutsche Wissenschaftliche Gesellschaft für Erdöl, Erdgas und Kohle e.V. [German Scientific Society for Oil, Natural Gas and Coal], Tagungsbericht [Proceedings] 9601 (1996) by C. HELLMICH, H. TRAPPE and J. FERTIG, which is titled "Bildverarbeitung seismischer Attribute und Geostatistik im Oberkarbon" [Image Processing of Seismic Attributes and Geostatistics in the Upper Carboniferous]. Said method permits a quantitative characterization of seismic representations and thus further interpretations of the lithology. Different image processing filters are employed in said process on amplitude charts, and the variations or the continuity of the local neighborhood are quantified. Said filters represent 2-D multi-trace filters, and the local environment surrounding a data point is evaluated with the help of such filters. Operators employed for said purpose include the entropy and the dispersion operators, among others. Charts can be produced for the interpretation with all attributes. The "entropy" or "dispersion" quantities are in this conjunction dimensional figures that quantify the variations or continuities of the amplitude within the local environment.

Application of the aforementioned methods for large areas is frequently excluded for cost reasons.

U.S. Pat. No. 5,432,751 and U.S. Pat. No. 5,153,858 describe the assignment of the value "0" or "1" to a sample, whereby such allocation only serves the purpose of marking and quickly finding again points in the seismic signal showing a defined characteristic. In said process, the purpose of such markings is to combine said points at a later time in a semi-automated process in a geological horizon (automatic picking), whereby the reduction in memory locations achieved through such assignment permits interactive processing of the entirety of the characteristic points. Therefore, the set of measured seismic data is first compared based on a defined characteristic and then marked according to the result of the corresponding horizon by "1". Said data set then exclusively serves for quickly finding again corresponding data positions of the original seismic data, which are substantially more comprehensive.

SUMMARY OF THE INVENTION

The problem of the invention is to propose a processing method for data sets of seismic measurements by which it is made possible to identify geological structures such as, for example faults or bed displacements, and also the stratigraphic, lithological and petrological conditions, with the lowest possible expenditure in terms of computing, paired at the same time with high objectivity of the results.

Said problem is solved with the method according to claims 1, 2 or 3.

It is essential to the invention in this conjunction that the set of measured data to be investigated, which data set comprises a great number of rows of data points occupied by amplitude values, such rows being time rows, as a rule, is converted into a binary data set, whereby a binary value "0" or "1" is assigned to each data point instead of the discrete amplitude value comprising several bytes. The discrete amplitude value is compared in this conjunction to a predetermined threshold value and assigned the number "0" if the amplitude value is lower versus the threshold value, or otherwise assigned the number "1". The amplitude information thus is binarized. The amount of data is reduced by the factor 32, for example in connection with the usual amplitude resolution of 4 bytes.

The binary data set so generated is subsequently subjected to a similarity analysis in an environment defined by a predetermined cell size, where the semblance of the binary data present in the cell is analyzed for each data point and the associated central data point is assigned a quantity reflecting the semblance.

The computing time is reduced vis-a-vis comparable methods of interpretation by about 97% because the computation has to be carried out only with binary quantities. Furthermore, the data of the result require reduced memory locations versus comparable methods because 1 byte suffices for representing the attribute "semblance", as a rule. Furthermore, due to the standardization of the binarization, the method is not depending on the level, so that no scaling problems occur with the representation of the result. Moreover, the result is more independent with respect to possible processing errors.

The data set generated as defined by the invention can be represented in the usual horizontal or vertical sections (slices and profiles), for example in gray levels or with color coding. Such charts and profiles show a clear reproduction of the geological structures such as, for example the localization of salt overhangs, the position and orientation of faults, bed and block displacements, horst and trench structures etc., and thus supply an instrument for assessing the underground. In particular, it is possible to determine on the basis of the data sets processed as defined by the invention hydrocarbon deposits, for example sites where oil and natural gas are trapped, and in general the lateral as well as also the vertical distribution of oil and natural gas deposits.

The value reflecting the similarity is computed by said method by counting the data points with the same binary value ("0" or "1" in each case) within the entire environmental cell, whereby the highest number is assigned to the central data point in the newly generated data set. High values reflect in this connection correspondence of the data values in the cell being viewed.

As an alternative, the determination of the similarity value is carried out by counting in each case the data points having the same binary value, "0" or "1"; however, separately for each horizontal slice of the cell having a data point. In an intermediate step, the greater number is assigned to the slice as the similarity value. According to said intermediate step, the sum of the individual values is assigned to the central data point in the newly generated data set. Horizontal weighting is taken into account with such a similarity analysis.

As a further alternative, weighting in the linear, vertical direction can be achieved along the respective seismic trace in that the data points having the same binary value, "0" or "1" in each case, are counted, but counted separately for each trace of the cell, i.e. for each binary time series of the latter. In an intermediate step, the greater number is then assigned to the trace as the similarity value. The sum of the individual, trace-related values of a cell is then assigned to the central data point in the newly generated data set.

As the usual amplitude values of seismic traces vary between +X and –X, whereby X is a maximally representable amplitude value, a threshold value around 0 would statistically supply an about equally weighed division of "0" and "1" in the binary data set generated in the binarization process. Preferably, however, a value is pre-adjusted that is by a few bits (LSB) greater or smaller than the threshold value.

Alternatively, it is possible to determine as the threshold value the amplitude value resulting prior to the binarization process as the most frequently occurring value from a histogram analysis of the set of measured data, or from a cutout therefrom.

If the cell approximated to the data point being processed comprises a rectangular/squared stone-shaped or elliptic/ellipsoidal environment, the result of the analysis will be obtained as much balanced as possible. Cube-shaped of spherically shaped cells are preferred in this connection.

A cell size that is suitable for many applications consists of 5×5 data points in connection with a 2-D data set, or of 5×5×5 data points with a 3-D data set.

A statically and dynamically corrected, stacked and migrated seismic measurement data set is preferably used as the starting point. Further processed sets of measured data, for example additionally filtered and depth-converted data sets can be employed as well. Likewise, the application on unstacked data, for example single-shot combinations (shotgather) and CMP-gather is possible. This includes derived seismic attributes such as acoustic impedance (from the seismic inversion) and AVO-attributes (e.g. AVO-gradient, AVO-intercept) as well.

BRIEF DESCRIPTION OF THE DRAWINGS

The invention is described in greater detail in the following with the help of an exemplified embodiment and by reference to the attached drawings, in which.

DETAILED DESCRIPTION OF THE DRAWINGS

Figure 1:
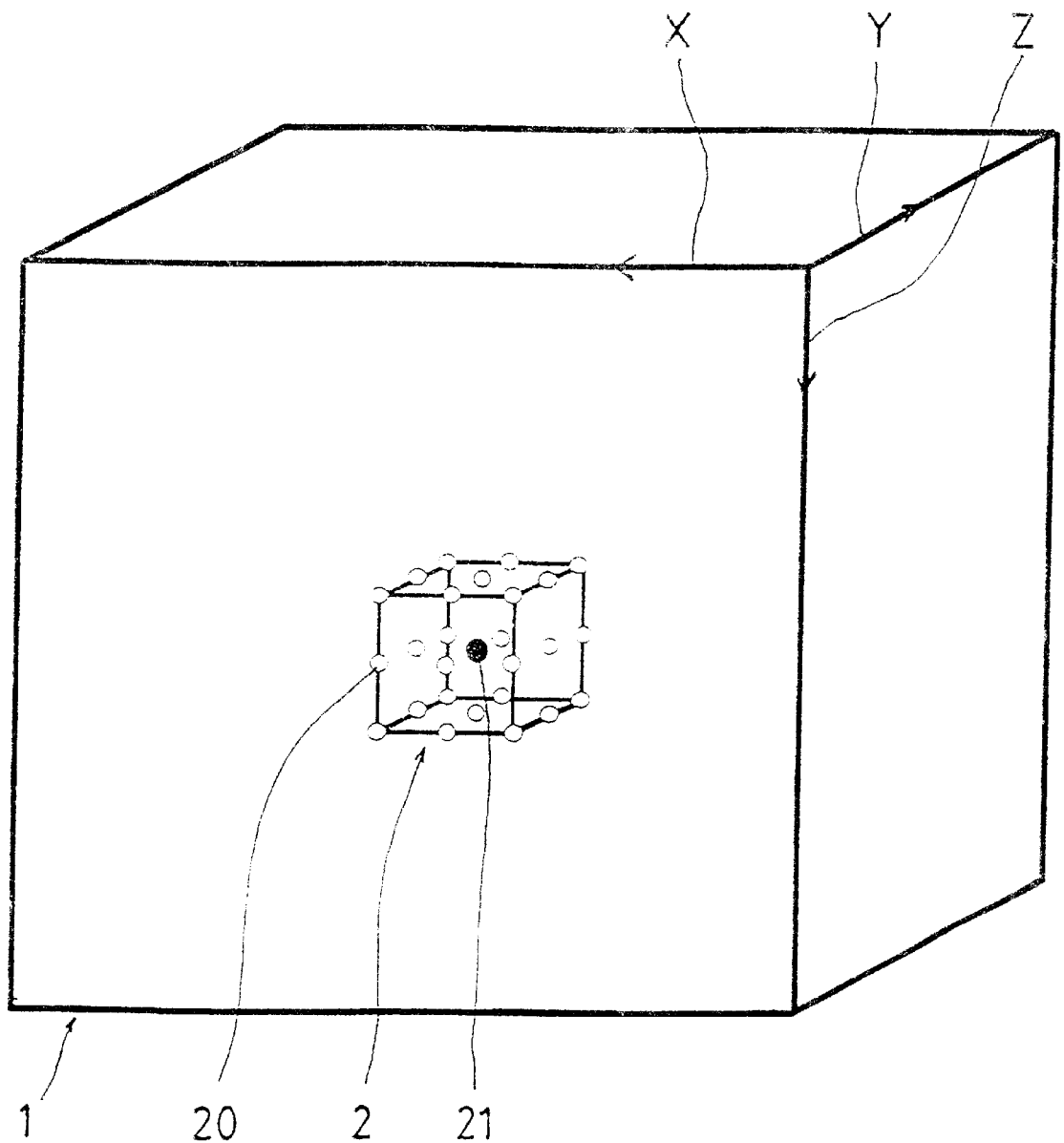
FIG. 1 is a schematically represented 3-D data volume with a cell marked by way of example.

A 3-D data set is shown in FIG. 1 in the form of a squared block-shaped volume 1. A great number of seismic traces, which are not shown individually, are combined in the 3-D data volume. The seismic traces have been preferably obtained in this connection from measured seismic profiles that are covered multiple times, by static and dynamic corrections with subsequent stacking and migration. Each seismic trace thus corresponds in this connection with a time series extending in the direction of the Z-axis (depth), whereby a digital amplitude value is assigned to each data point (sample). The spacing of the data points is dependent upon the scanning rate, which, in the field of seismology, usually amounts to 1, 2 or 4 milliseconds. The spacing of the traces in the lateral direction (X- and Y-directions) is dependent on the geometry of the layout and the shot frequency and usually amounts to 12.5 m, 25 m or 50 m.

Figure 4:
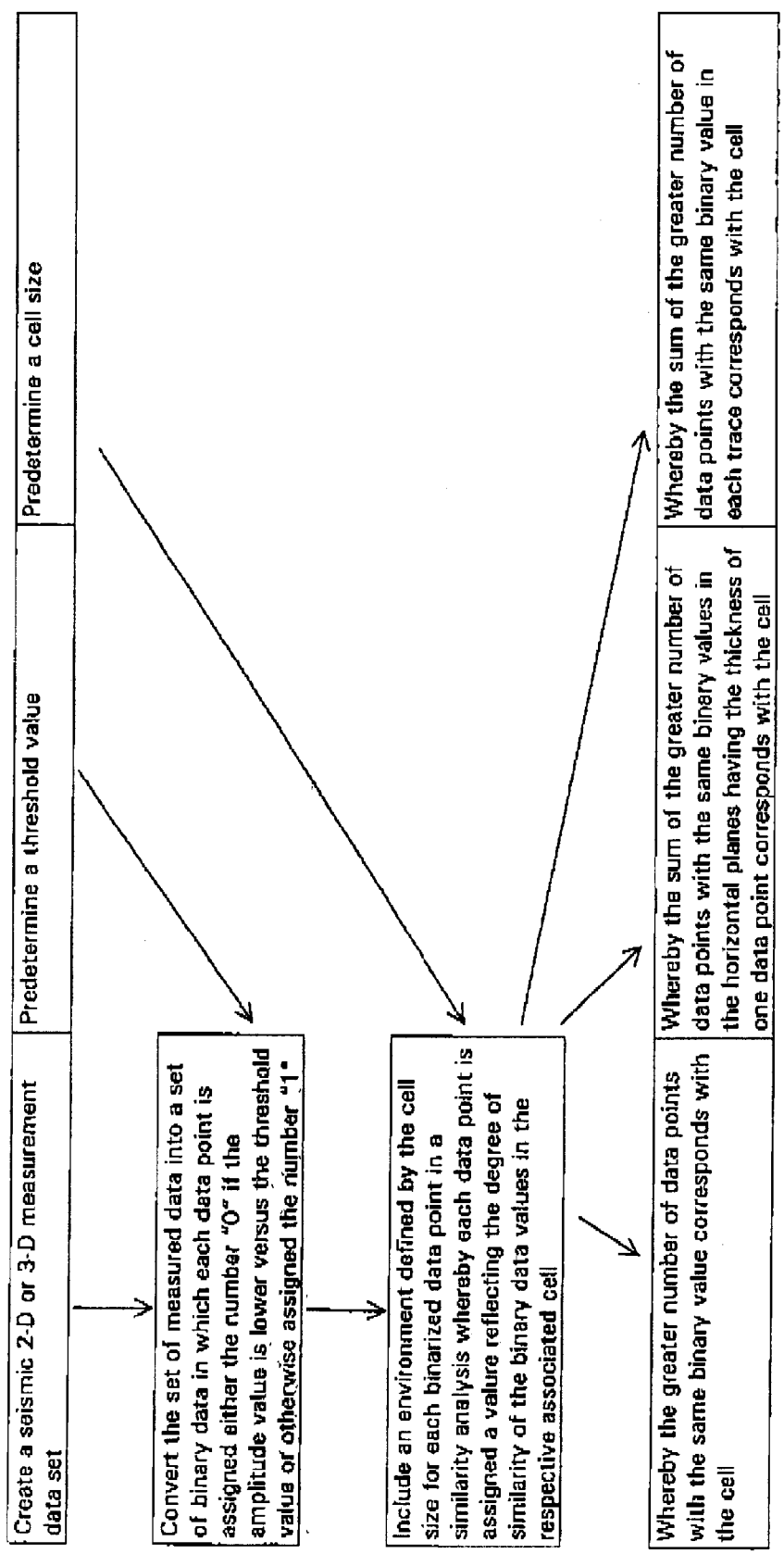
FIG. 4 is a flow chart showing the process according to the invention.

Now, as shown in the process in FIG. 4, each amplitude value of a data point in the data volume is first compared with a threshold value, denoted by "0" or by "1" if it exceeds the threshold value. A binary data set is thus generated with the same number and arrangement of data points, with only one binary values (either "0" or "1") being assigned to each data point.

Now, a neighborhood cell is preselected for further processing, such further processing comprising for each central data point viewed a defined number and geometric arrangement of neighboring data points.

The size of the cell may be selected in this connection in any desired magnitude both in the lateral direction (X- and Y-directions) and the vertical direction. The shape of the cell is not fixed either. Because of the three-dimensional matrix of the data points, a squared stone-shaped or cube-shape form of the cell appears preferably. However, approximately cylindrical, ellipsoidal or parallelepiped-shaped cells may be preselected as well. The selection of the cell size is dependent upon the geological conditions reflected in the data set, on the one hand, and on the geometric/time matrix spacing of the data points in the data set on the other.

A cell 2 in the form of a cube comprising 3×3×3 data points is shown in FIG. 1 for illustration purposes. Such a cell 2 comprises 27 binary data points 20 in the cell 2. The data points located directly adjacent around a central data point 21 are thus taken into account in the evaluation of said central data point 21 as well.

It is emphasized at this point that a cell size of 5×5×5 was found to be particularly advantageous in practical applications. The cell size represented in FIG. 1 especially serves for illustration purposes.

Now, said pre-adjusted environmental cell is formed for each data point contained in the considered data volume for the subsequent similarity analysis. An evaluation is carried out along the edges of the data set only for data points for which the environmental cell is completely contained in the data volume. Alternatively, it is possible also to add zero traces along the edges so as to be able to compute similarity values for data points disposed on the edge of the original data set as well, whereby the similarity value is influenced by the added-on zero traces.

In the similarity analysis, a value reflecting the similarity in the respective environmental cell is then assigned to each central or center-point data point. A data set with the same data point matrix is thus generated from the binary data set, whereby a similarity value is assigned to each data point as the attribute.

Figure 2:
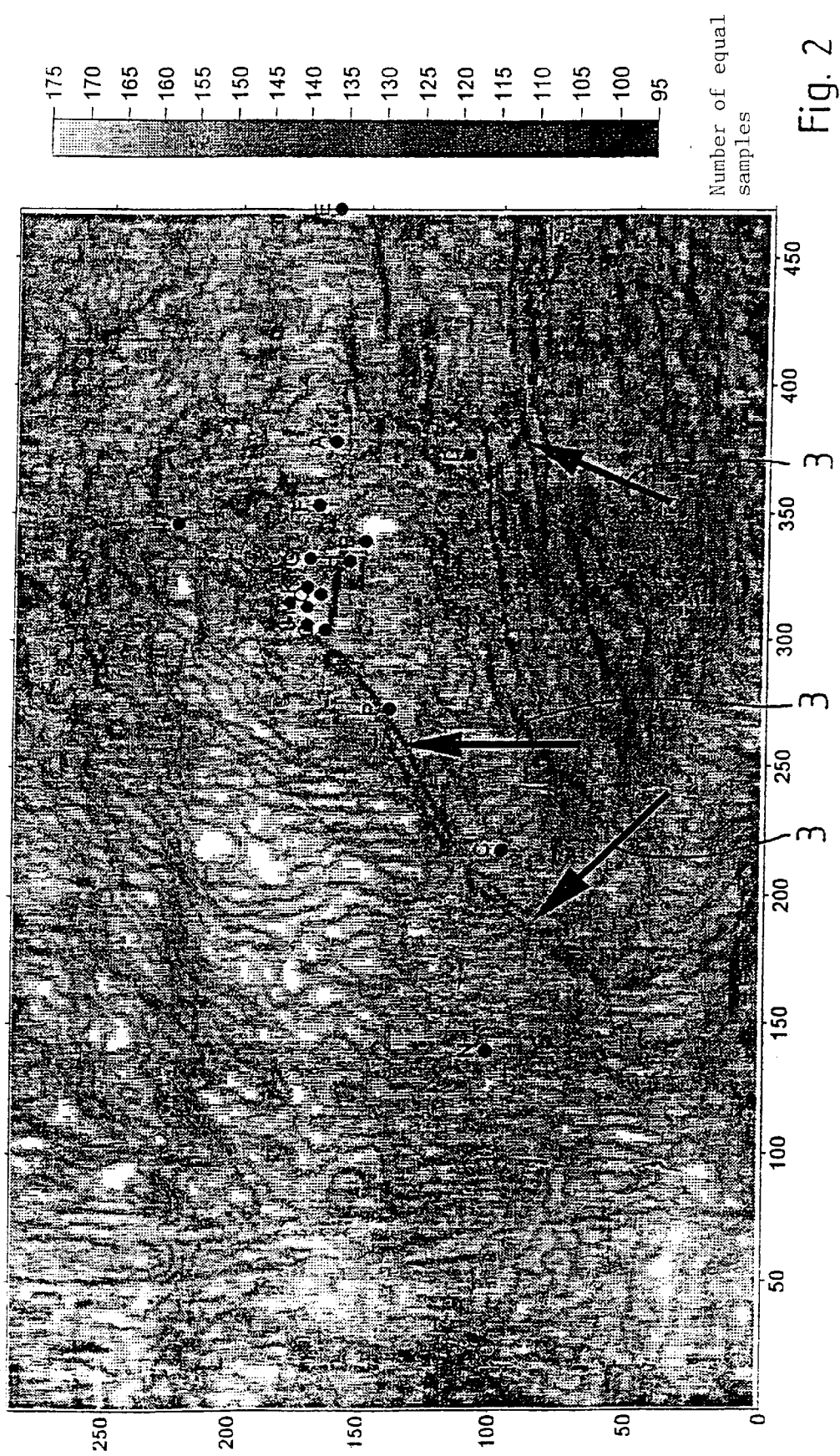
FIG. 2 shows the top edge of the earth bed from a data set processed as defined by the invention in the form of a chart representation.

FIG. 2 shows a chart representation of the top edge of a layer following processing by the method as defined by the invention.

In said representation, the top edge of said layer was marked (picked) in the 3-D data set volume in the usual seismic data evaluation.

For seismic data processing as defined by the invention, the 3-D data volume was converted as described above into a binary data set. Now, the similarity analysis for the data points representing the top edge of the layer was carried out along the marked top edge of the layer having a data point. In the exemplified embodiment, use was made of a cell size of 5×5×7 data points in the X-, Y- and Z-directions. Said environment was viewed for each data point along the top edge of the layer. In said process, the greater number of equal binary values in the viewed cell was assigned to the considered central data point as the similarity value. The range of the values thus comprises natural numbers from 88 to 175, which are accordingly shown in the chart representation in FIG. 2 on the right-hand side by gray shades.

Figure 3:
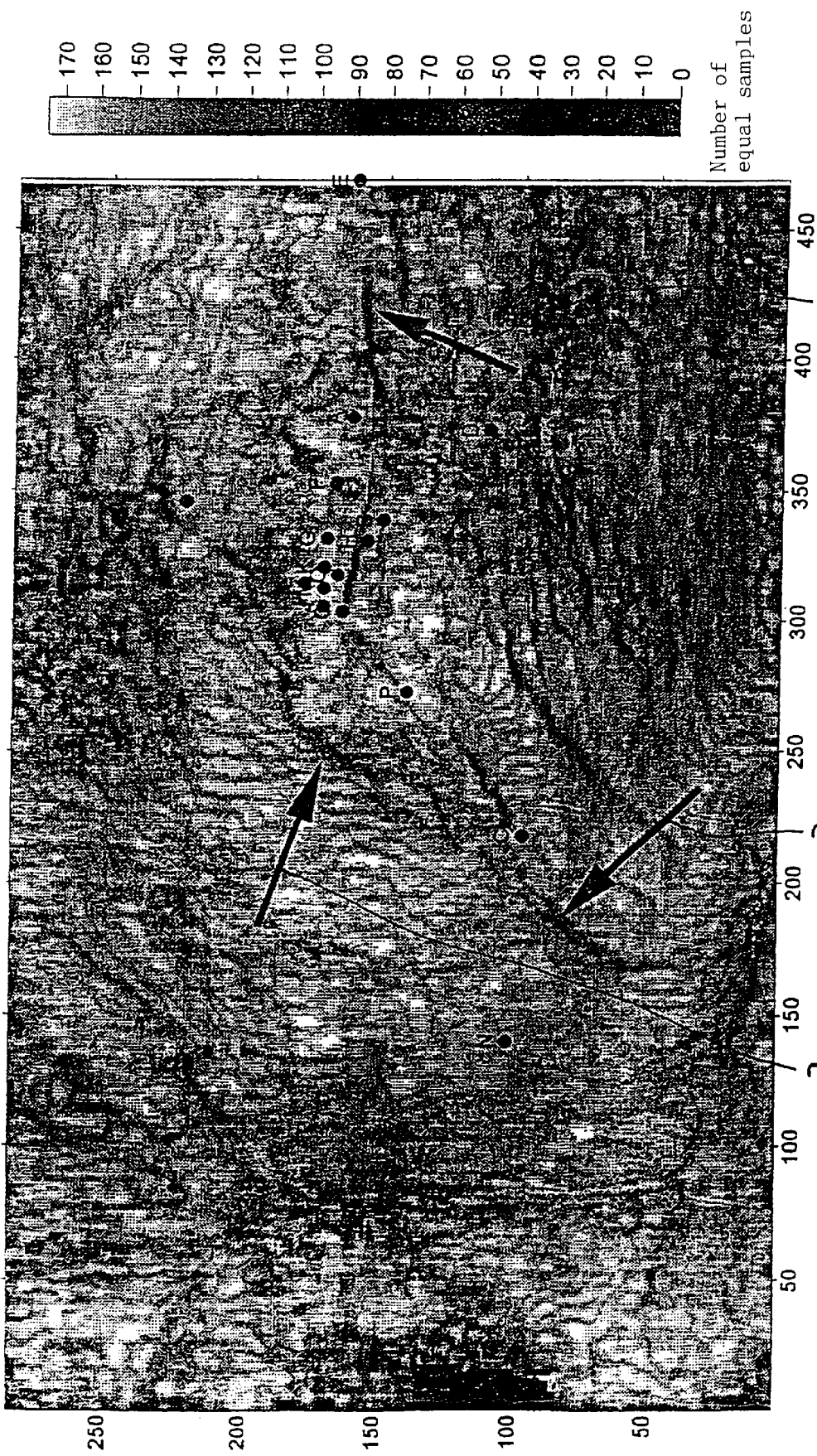
FIG. 3 shows the top edge of another earth bed of the same measured area by a representation as in FIG. 2.

FIG. 3 is a corresponding chart representation of another top edge of a layer, which is generated by processing in accordance with FIG. 2.

In both figures, drilling locations present in the measured area are marked by capital letters.

The data sets shown in the form of charts and processed as defined by the invention facilitate the interpretation of subterranean data. For example, in FIGS. 2 and 3, fault zones can be clearly identified in the sites marked by the arrows 3. Such fault zones can be located in conventionally processed 3-D data sets only with difficulty.

The application of the method as defined by the invention permits achieving enhanced identification of geological structures as well as of the stratigraphic, lithological and petrological conditions. The computing expenditure is minimized in this connection by binarizing the amplitude values, as well as with the help of the similarity analysis, which is realized with simple computing rules.

What is claimed is:

1. A method for efficiently processing a seismic 2-D or 3-D measurement data set comprising a large number of seismic traces, wherein each data set comprises a series of data points having amplitude values, the method comprising the steps of:
   a) determining a threshold value for the series of data points;
   b) converting the set of measured data into a set of binary data comprising a plurality of binarized data points in which each data point is assigned either a number "0" if an amplitude value is lower than said threshold value or a number "1" if an amplitude value is equal or greater than said threshold value;
   c) forming for each binarized data point a cell of a predetermined cell size from said plurality of binarized data points wherein each cell defines an environment including a central data point; and
   d) conducting a similarity analysis on each cell wherein each of said cells has said central data point and said central data point is assigned a similarity value reflecting the degree of similarity of binary data values in its respective cell wherein said similarity value corresponds to the quantity of the greatest number of the data points in the cell with the same binary value.

2. The method according to claim 1, wherein said threshold value has an initial value that is slightly greater or smaller than zero.

3. The method according to claim 1, wherein said step of determining a threshold value includes subjecting the set of measured data or a cutout therefrom to a histogram analysis prior to the binarization, and wherein the most frequently occurring amplitude value is used as the threshold value.

4. The method according to claim 1, wherein the cell associated with each processed central data point comprises an approximately rectangular/squared stone-shaped or an elliptic/ellipsoidal environment.

5. The method according to claim 1, wherein the cell size is preadjusted to 5×5 (×5) data points.

6. The method according to claim 1, wherein the seismic measurement data set is statically and dynamically corrected.

7. The method according to claim 1, wherein the Seismic measurement data set is time- or depth-migrated.

8. The process as in claim 1, wherein said step of converting said measured data into binary data is performed to reduce the size of the measured data in the data set, and wherein said step of converting a set of measured data into a set of binary data and said step of conducting a similarity analysis, reduces the computing time by approximately 97%.

9. A method for efficiently processing a seismic 2-D or 3-D measurement data set comprising a large number of seismic traces, wherein each data set comprises a series of data points having amplitude values, the method comprising the steps of:
   a) determining a threshold value for the series of data points;
   b) converting the set of measured data into a set of binary data comprising a plurality of binarized data points in which each data point is assigned either a number "0" if an amplitude value is lower than said threshold value or a number "1" if an amplitude value is equal or greater than said threshold value;
   c) forming for each binarized data point a cell of a predetermined cell size from said plurality of binarized data points wherein each cell defines an environment including a central data point; and
   d) conducting a similarity analysis on each cell, wherein said central data point for each of said plurality of cells is assigned a similarity value reflecting the degree of similarity of binary data values in each of said plurality of separate cells and wherein said similarity value corresponds to a sum of each quantity of the greater number of data points with the same binary values in each horizontal plane of each cell.

10. The process as in claim 9, wherein said step of converting said measured data into binary data is performed to reduce the size of the measured data in the data set, and wherein said step of converting a set of measured data into a set of binary data and said step of conducting a similarity analysis, reduces the computing time by approximately 97%.

11. A method for efficiently processing a seismic 2-D or 3-D measurement data set comprising a large number of seismic traces, wherein each data set comprises a series of data points having amplitude values, the method comprising the steps of:
   a) determining a threshold value for the series of data points;
   b) converting the set of measured data into a set of binary data comprising a plurality of binarized data points in which each point is assigned either a number "0" if an amplitude value is lower than said threshold value or a number "1" if an amplitude value is higher than said threshold value;
   c) forming for each binarized data point a cell of a predetermined cell size from said plurality of binarized data points wherein each cell defines an environment including a central data point; and
   d) conducting a similarity analysis on each cell wherein a central data point for each of said plurality of cells is assigned a similarity value reflecting the degree of similarity of binary data values in each of said plurality of cells, wherein said similarity value corresponds to a sum of each quantity of the greater number of data points with the same binary value in each trace.

12. The process as in claim 11, wherein said step of converting said measured data into binary data is performed to reduce the size of the measured data in the data set, and wherein said step of converting a set of measured data into a set of binary data and said step of conducting a similarity analysis, reduces the computing time by approximately 97%.

* * * * *